(12) United States Patent
Sugeta (10) Patent No.: US 7,352,495 B2
(45) Date of Patent: Apr. 1, 2008

(54) IMAGE READING APPARATUS (75) Inventor: Mitsuhiro Sugeta, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 903 days.

(21) Appl. No.: 10/712,993

(22) Filed: Nov. 17, 2003

(65) Prior Publication Data
US 2004/0125412 A1 Jul. 1, 2004

(30) Foreign Application Priority Data
Nov. 22, 2002 (JP) ............................ 2002-339219

(51) Int. Cl.
*H04N 1/04* (2006.01)
(52) U.S. Cl. ...................... 358/474; 358/463; 358/443; 358/486; 358/496
(58) Field of Classification Search ................ 358/497, 358/494, 496, 463, 465, 488, 443, 486; 382/275, 382/312, 318, 319
See application file for complete search history.

(56) References Cited
U.S. PATENT DOCUMENTS 5,930,008 A * 7/1999 Nabeshima et al. ........ 358/496
6,600,579 B1 * 7/2003 Kumagai et al. ........... 358/474
2006/0066921 A1 * 3/2006 Saka et al. .................. 358/474
2007/0002393 A1 * 1/2007 Okawa ....................... 358/462

FOREIGN PATENT DOCUMENTS

| EP | 1 102 468 A2 | | 5/2001 |
| JP | 09009011 A | * | 1/1997 |
| JP | 2001-144901 | | 5/2001 |
| JP | 2002-77584 | | 3/2002 |

* cited by examiner

*Primary Examiner*—Cheukfan Lee
(74) *Attorney, Agent, or Firm*—Fitzpatrick, Cella, Harper & Scinto (57) ABSTRACT

When an optical image obtained by an optical scanning unit of optically scanning an original sheet automatically fed by an original sheet feeder is read, it is discriminated in units of pixel whether or not dirt or scratch attached to a running reading glass plate is present. Moreover, the number of the dirt and the width of the dirt are detected, and an image reading position which does not come under the influence of the dirt as much as possible is set based on the detected number of the dirt and the detected width of the dirt even when the dirt is detected at all the reading positions.

4 Claims, 9 Drawing Sheets

IMAGE READING APPARATUS

BACKGROUND OF THE INVENTION

1. Field of the Invention

The present invention relates to an image reading technique in a copying machine, a scanner, a facsimile machine and the like, and more particularly to an image reading apparatus which makes occurrence of a black-striped image and a white-striped image due to dirt and the like difficult and, when the black-striped image and the white-striped image are corrected, reduces deterioration of image quality, in case of reading an original sheet as shifting it with a light scanning unit stopped.

2. Related Background Art

Conventionally, in image forming apparatuses such as a copying machine, a scanner, a facsimile machine and the like, an image reading apparatus which has a so-called running reading (or flow scanning) function to read original sheet image information as shifting an original sheet by an automatic original sheet feeding apparatus (called ADF (Auto Document Feeder) hereinafter) in a state that an light scanning unit of irradiating light to the original sheet is being stopped at a predetermined original sheet reading position is known. Here, the ADF is generally provided as an option and structured to be detachable in regard to the main body of the image reading apparatus. In the image reading apparatus, there is a problem that a black stripe or a white stripe occurs (or appears) at a main-scan position of a reading image if dirt or scratch is present on a part of an original sheet glass plate being on an optical path of an image reading unit.

Thus, as a method of eliminating the occurrence of black stripe or white stripe, there is a method of cleaning up the surface of the original sheet glass plate, a method as in Japanese Patent Application Laid-Open No. 2001-144901 of first detecting the occurrence of black stripe or white stripe due to dirt or scratch on the original sheet glass plate and then changing a running reading position according to the detected result, or a method as in Japanese Patent Application Laid-Open No. 2002-77584 of first detecting the occurrence of black stripe or white stripe due to dirt or scratch on the original sheet glass plate and then correcting based on the detected result the values of pixels corresponding to the dirt portion of the reading image by using the values of plural adjacent pixels according to the width of the dirt portion.

However, when the dirt is detected at all the set reading positions, the black stripe or the white stripe occurs even if the reading position is changed. Thus, image quality deteriorates when image data is corrected.

SUMMARY OF THE INVENTION

An object of the present invention is to reduce deterioration in image quality caused due to influence of dirt, scratch or the like on an original sheet glass plate in case of running reading (or flow scanning of an original sheet).

In order to achieve the above object, an image reading apparatus according to one embodiment of the present invention comprises: a linear image sensor which photoelectrically converts an optical image obtained by optically scanning an original sheet and reads it in units of line; an original sheet feeding unit which feeds the original sheet onto an original sheet glass plate; a discrimination unit which, in a case where abnormal pixel data of two or more pixels are continuously obtained on a reading line of the linear image sensor by reading the original sheet glass plate through the linear image sensor, discriminates that dirt is present on the original sheet glass plate or there is abnormality in the original sheet glass plate; and a setting unit which sets a line on which the maximum pixel number that the abnormal pixel data continue is the least, as the reading line.

Moreover, an image reading apparatus according to another embodiment of the present invention comprises: a linear image sensor which photoelectrically converts an optical image obtained by optically scanning an original sheet and reads it in units of line; an original sheet feeding unit which feeds the original sheet onto an original sheet glass plate; a discrimination unit which, in a case where abnormal pixel data of two or more pixels are continuously obtained on a reading line of the linear image sensor by reading the original sheet glass plate through the linear image sensor, discriminates that dirt is present on the original sheet glass plate or there is abnormality in the original sheet glass plate; a counting unit which counts the number of the dirt and the abnormality on the one line discriminated by the discrimination unit; and a setting unit which sets a line on which the number of the dirt and the abnormality counted by the counting unit is the least, as the reading line.

Furthermore, an image reading apparatus according to another embodiment of the present invention comprises: a linear image sensor which photoelectrically converts an optical image obtained by optically scanning an original sheet and reads it in units of line; an original sheet feeding unit which feeds the original sheet onto an original sheet glass plate; a discrimination unit which, in a case where abnormal pixel data of two or more pixels are continuously obtained on a reading line of the linear image sensor by reading the original sheet glass plate through the linear image sensor, discriminates that dirt is present on the original sheet glass plate or there is abnormality in the original sheet glass plate; a counting unit which counts the total number of pixels of the abnormal pixel data making the dirt and the abnormality on the one line discriminated by the discrimination unit; and a setting unit which sets a line on which the total number of pixels counted by the counting unit is the least, as the reading line.

Other objects and features of the present invention will be apparent from the following descriptions and the accompanying drawings, in which like reference characters designate the same or similar parts throughout the figures thereof.

DETAILED DESCRIPTION OF THE PREFERRED EMBODIMENTS

First Embodiment

Hereinafter, the embodiment of the present invention will be explained in detail with reference to the attached drawings.

Figure 1:
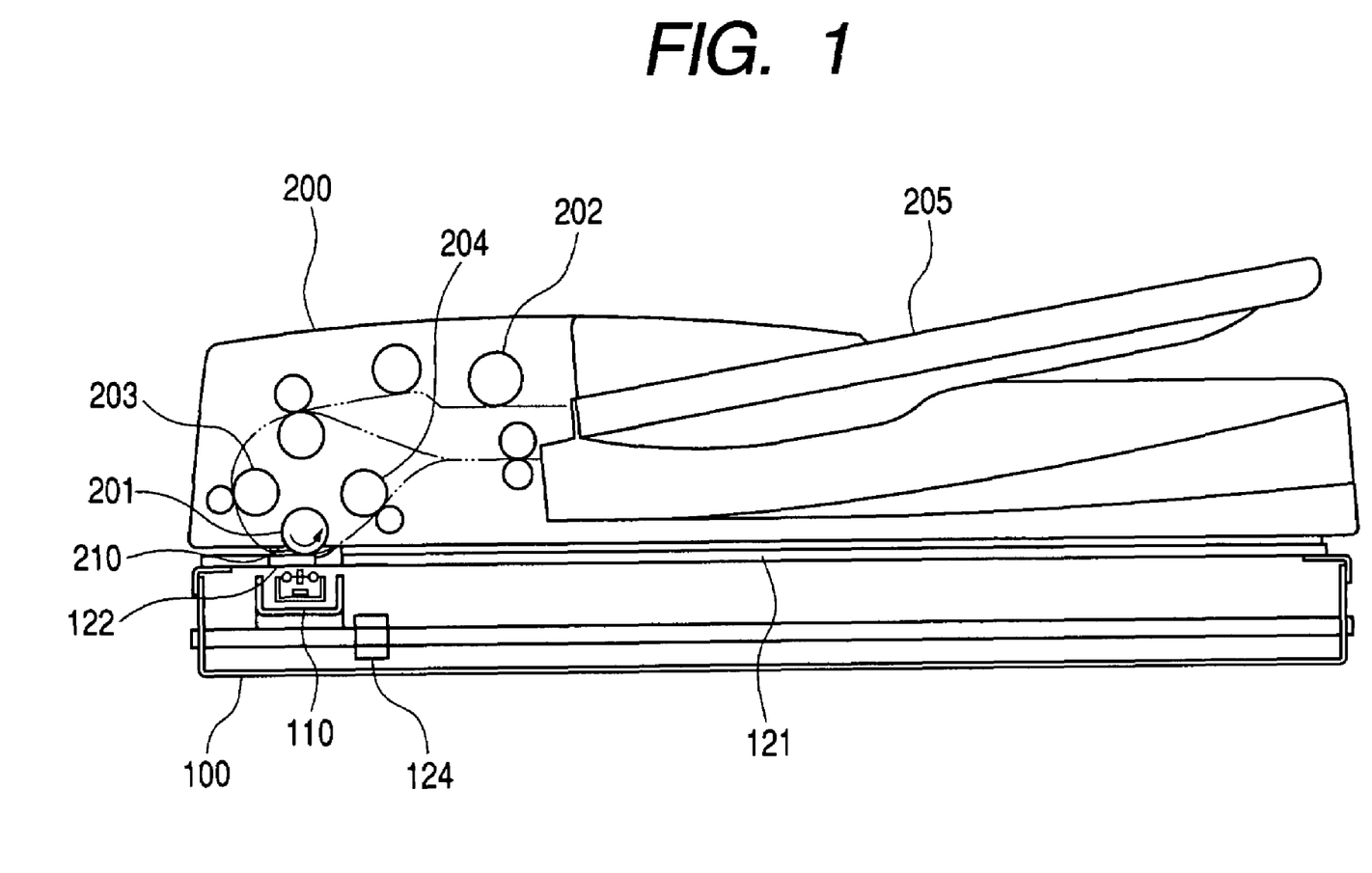
FIG. 1 is a sectional view showing the schematic structure of an image reading apparatus according to the embodiments of the present invention.

FIG. 1 is a sectional view showing the schematic structure of an image reading apparatus to which the present invention is applied. In FIG. 1, an image reading apparatus 100, and an ADF 200 structured to be detachable in regard to the image reading apparatus 100 are provided.

The ADF 200 transports an original sheet set on a sheet feeding tray 205 to a running reading glass plate 122 of the image reading apparatus 100 by means of transporting rollers 203 and 204 and then withdraws (or collects) the processed original sheet. At that time, the original sheet is optically scanned by the image reading apparatus 100 while it is passing between a platen roller 201 fitted in the ADF 200 and the running reading glass plate 122 of the image reading apparatus 100, whereby original sheet information is read from the scanned original sheet.

That is, the image reading apparatus 100 includes a CIS (contact image sensor) 110 which integrally contains in a casing 114 lamps 111 (FIGS. 2 and 3) for irradiating light to the original sheet surface, a lens 112 (FIGS. 2 and 3) for guiding reflection light corresponding to the light irradiated by the lamp 111 and transmitted from the original sheet to an image sensor 113 (FIG. 3), and the image sensor 113 for photoelectrically converting the incident reflection light from the original sheet.

Figure 2:
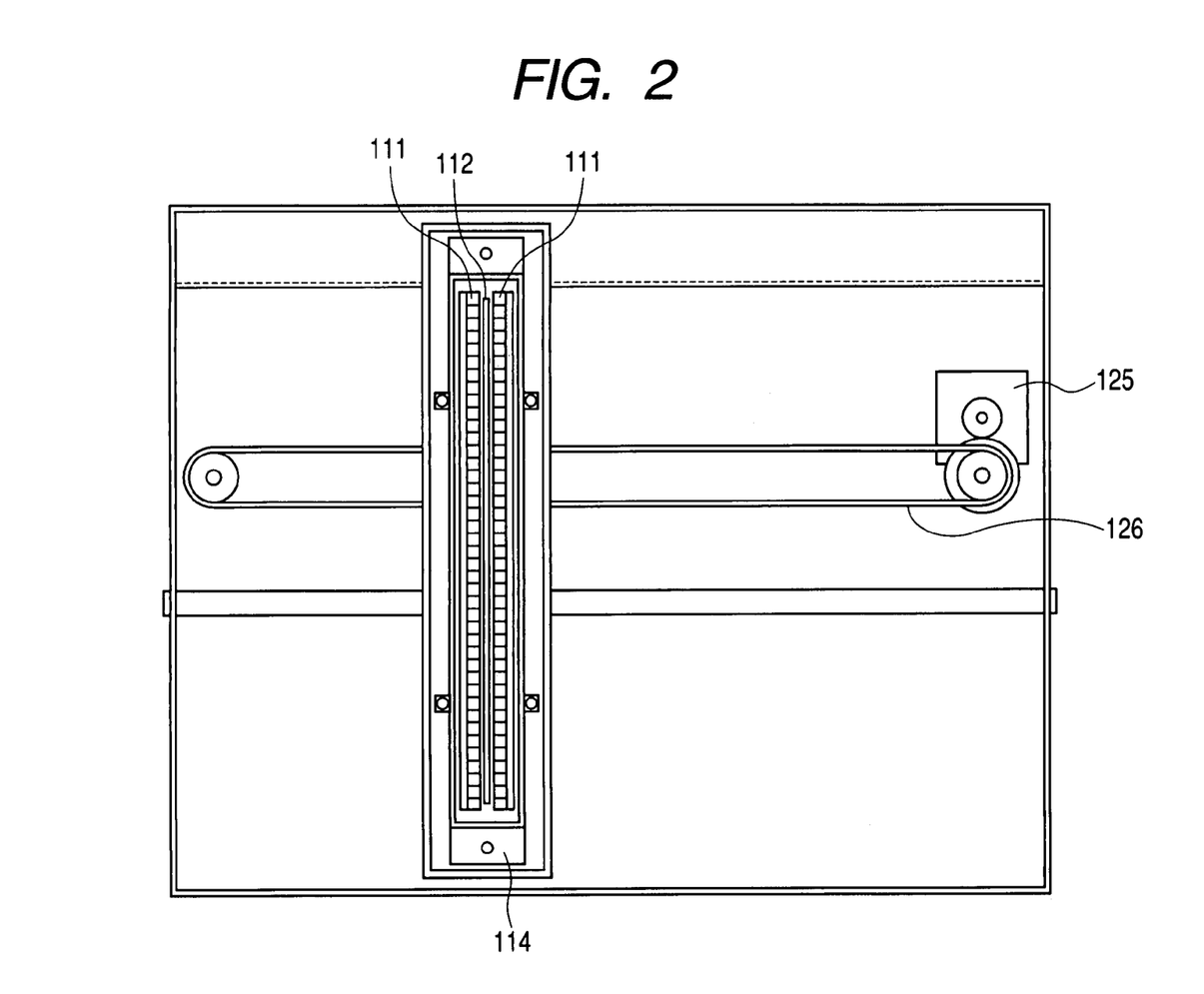
FIG. 2 is a top plan view showing a reading unit of the image reading apparatus according to the embodiments of the present invention.

Moreover, the CIS 110 is connected to a motor 125 through a timing belt 126 as shown in FIG. 2, and is controlled to be shifted in parallel with an original sheet glass plate 121 and the running reading glass plate 122 by rotatively driving the motor 125. A position sensor 124 is the sensor to detect the home position of the CIS 110, and the CIS 110 is shifted by normally and reversely rotating the motor 125 on the basis of the position of the position sensor 124, thereby optically scanning the original sheet on the original sheet glass plate 121 or the running reading glass plate 122.

Moreover, the motor 125 consists of a stepping motor, and an encoder 402 (FIG. 4) is connected to the motor 125, whereby it is possible in response to the output from the encoder 402 to confirm how many pulses the CIS 110 has been shifted by. In other words, it is possible to grasp the position of the CIS 110 by means of the position sensor 124 and in response to the encoder pulse from the encoder 402.

On the other hand, the reflection light from the original sheet is guided and concentrated on the linear image sensor 113 by the Selfoc lens 112, and the concentrated reflection light on which the original sheet information has been reflected is photoelectrically converted and output as an electronic image signal.

Under such a structure, the original sheet information can be read in two kinds of modes, i.e., an ADF original sheet reading mode for reading the original sheet information as transporting the original sheet on the running reading glass plate 122 by the ADF 200 in the state that the CIS 110 is being stopped at the original sheet reading position, and an original sheet glass plate original sheet reading mode for reading the original sheet information as fixedly putting on the original sheet on the original sheet glass plate 121 and shifting the CIS 110 in the sub scan direction.

Figure 3:
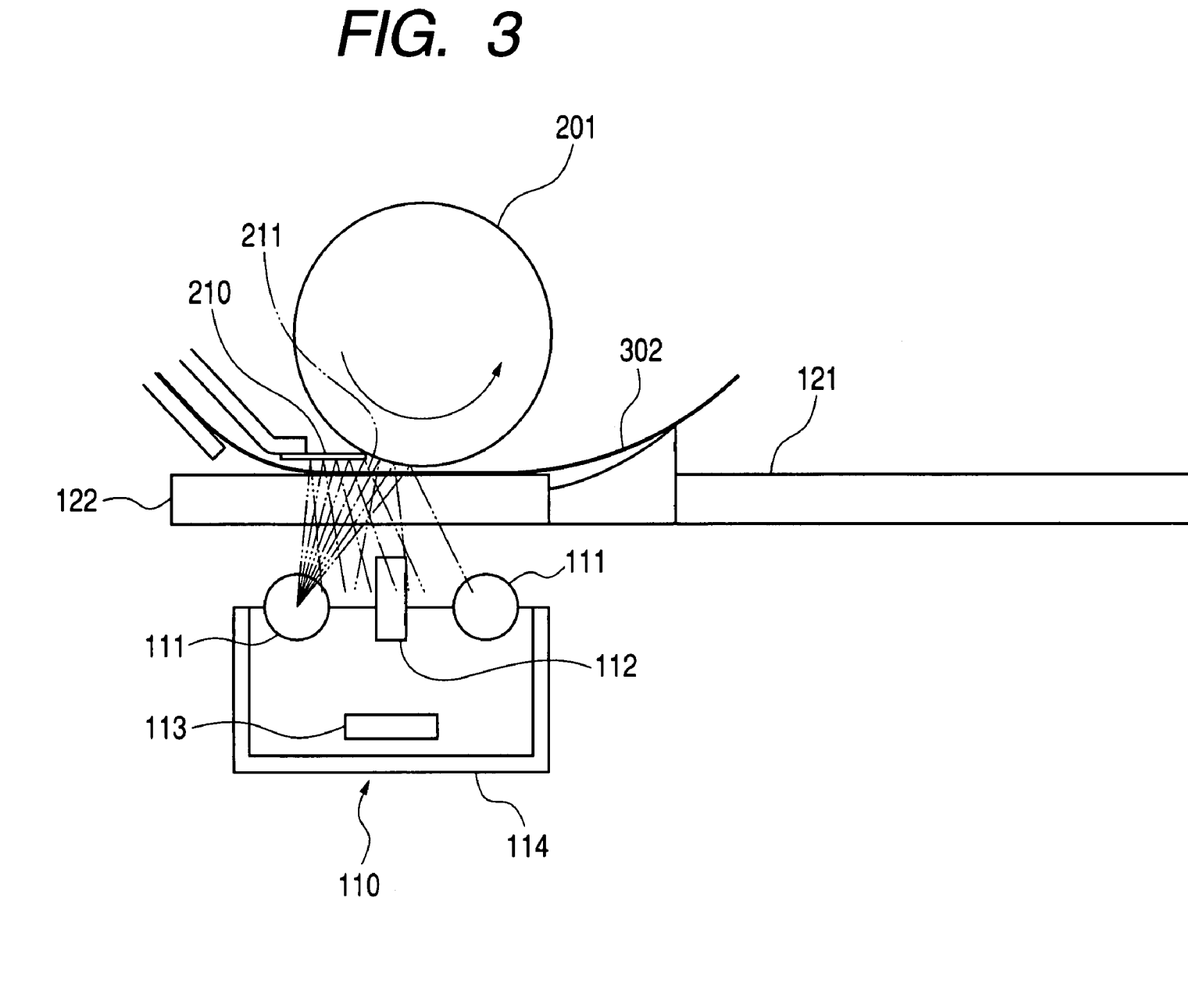
FIG. 3 is a detailed sectional view showing a running reading unit of the image reading apparatus according to the embodiments of the present invention.

FIG. 3 is the sectional view showing the structure nearby the CIS 110. The ADF 200 in the present embodiment is equipped with a white sheet member 210 on the upstream side along the original sheet transporting direction of the platen roller 201, and the white sheet member 210 is disposed substantially in parallel with the running reading glass plate 122. Besides, an edge position 211 where the white sheet member 210 comes closest to the platen roller 201 is disposed so that the part of the platen roller 201 is covered with the white sheet member 210 substantially over the whole image reading area in the main scan direction of the CIS 110 when the platen roller 201 and the white sheet member 210 are viewed from the reading direction of the CIS 110, i.e., the direction perpendicular to the running reading glass plate 122. Moreover, when an original sheet 302 is not transported, the reading position in the ADF original sheet reading mode is set to the position where the surface of the platen roller 201 can be read.

Figure 4:
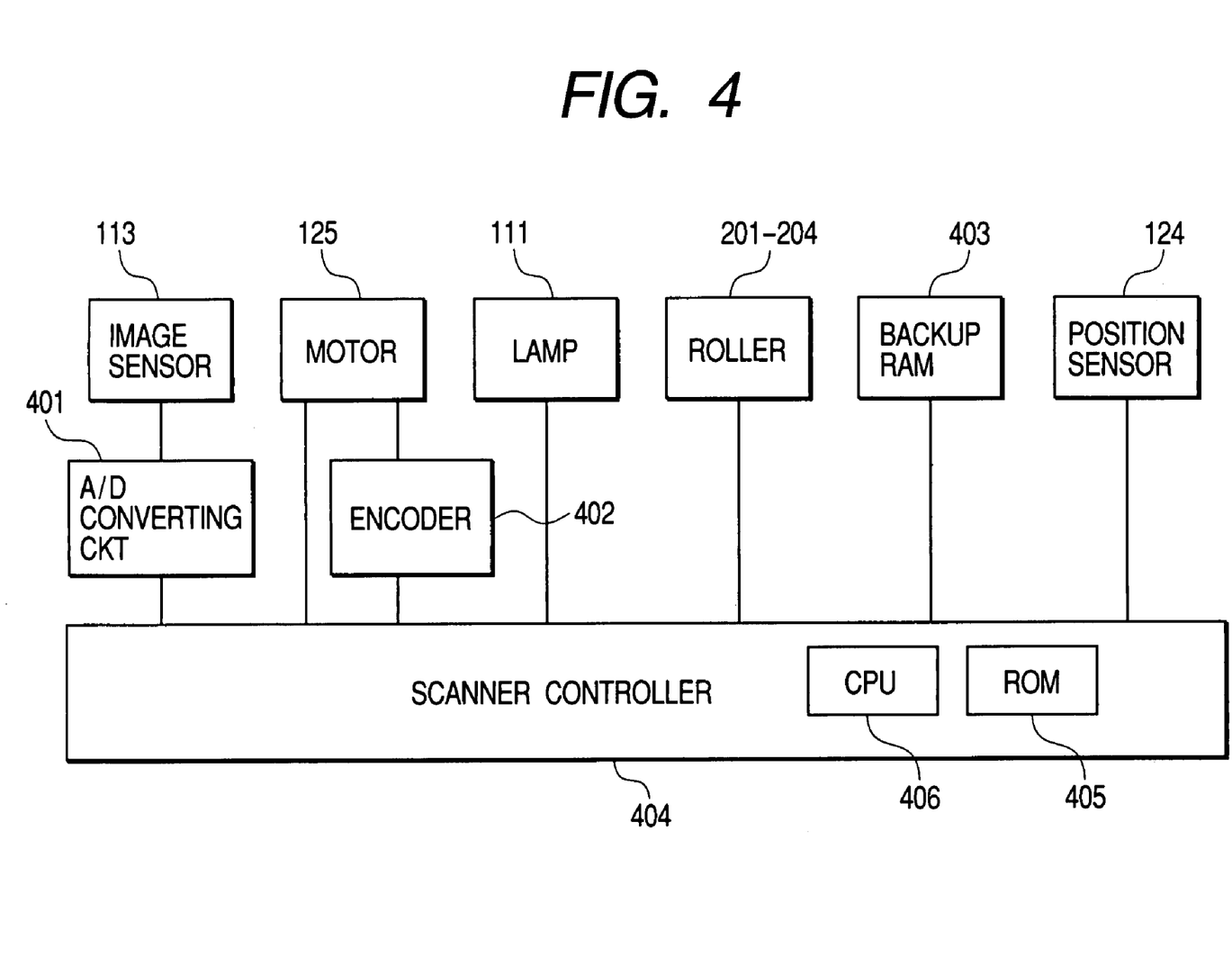
FIG. 4 is a block diagram showing the structure of a control system of the image reading apparatus shown in FIG. 1.

FIG. 4 is a block diagram showing the schematic structure of a control system of the image reading apparatus according to the present embodiment. As shown in FIG. 4, the control system consists of the platen roller 201, a sheet feed roller 202 and the transporting rollers 203 and 204 which are used to transport the original sheet, the lamp 111 which irradiates light onto the original sheet surface, the motor 125 which is used to scan the original sheet by shifting the CIS 110 in the sub scan direction, the linear image sensor 113 on which the plural photoelectric converting pixels for photoelectrically converting the reflection light from the original sheet surface are linearly arranged, an A/D converting circuit 401 which analog-to-digital converts the output signal from the linear image sensor 113, the encoder 402 which is connected to the motor 125, the position sensor 124 which is used to locate the CIS 110 at the home position, and a scanner controller 404. Besides, a backup RAM 403 is used to temporarily store the data when various processes are executed by the scanner controller 404.

Incidentally, the scanner controller 404 consists of a ROM 405 which stores various programs such as programs corresponding to processes shown in later-described flow charts, and a CPU 406 which controls the system as a whole.

Figure 5:
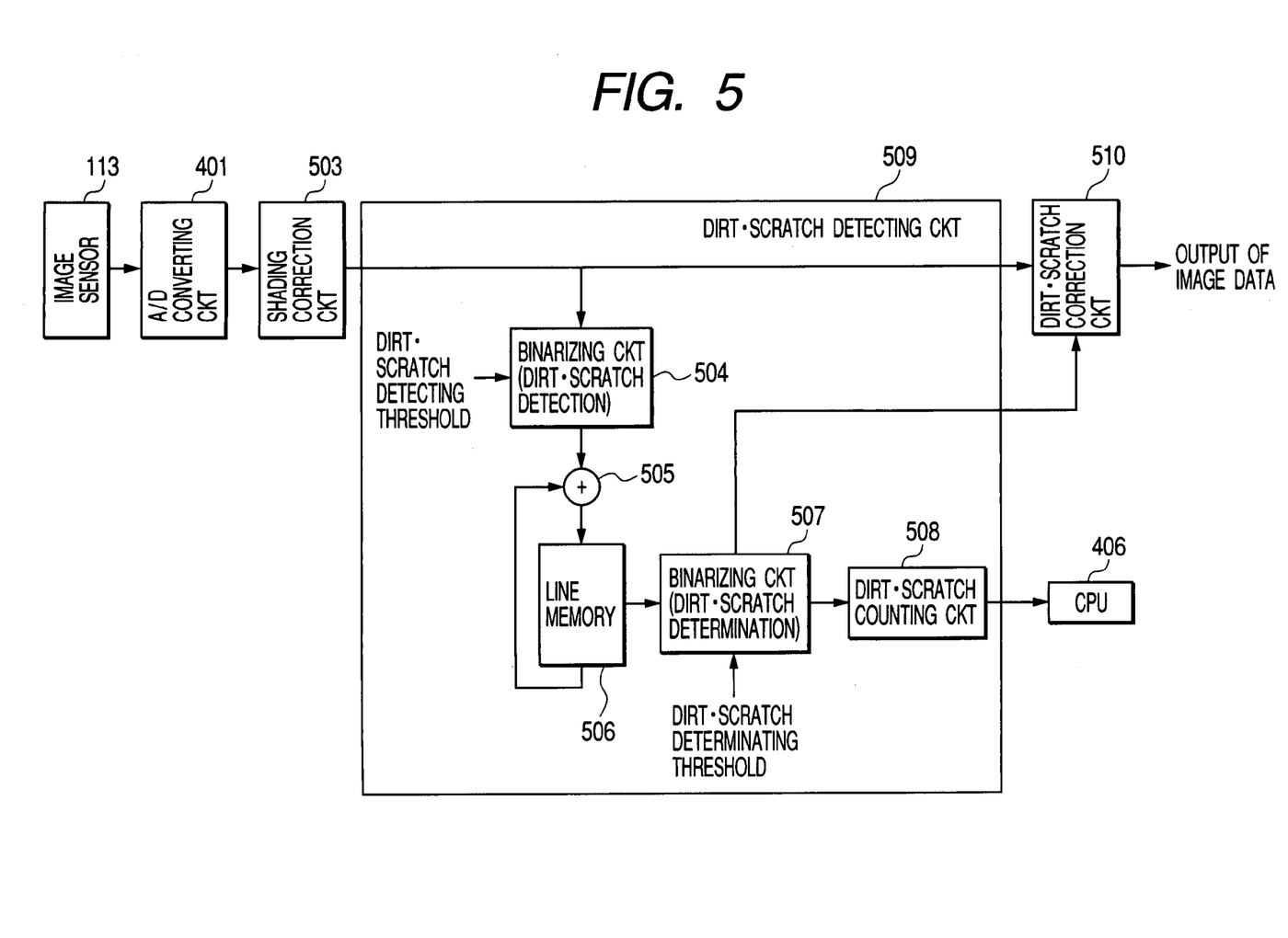
FIG. 5 is a block diagram showing the structure of the control system including a dirt•scratch detecting circuit in the image reading apparatus according to the embodiments of the present invention.

FIG. 5 is a structural block diagram showing an image data flow, including a dirt•scratch detecting circuit of the image reading apparatus according to the present embodiment. Such a structure includes the linear image sensor 113 which photoelectrically converts the reflection light from the original sheet surface, the A/D converting circuit 401 which analog-to-digital converts the output signal from the linear image sensor 113, a shading correction circuit 503, a dirt•scratch detecting circuit 509, a dirt•scratch correction circuit 510, and the CPU 406. Besides, the dirt•scratch detecting circuit 509 consists of a dirt•scratch detection binarizing circuit 504, an adding circuit 505, a line memory 506, a dirt•scratch discrimination binarizing circuit 507, and a dirt•scratch counting circuit 508.

Hereinafter, the function of each of the above components will be explained in detail. The image sensor 113 executes the photoelectrical conversion based on the reflection light transmitted from the original sheet and then outputs the electrical signal, and the A/D converting circuit 401 converts the analog signal output from the linear image sensor 113 into a digital signal. Subsequently, the shading correction circuit 503 executes the shading correction based on the output signal from the A/D converting circuit 401, reads the shading-corrected image signal, and then outputs the read image signal to the dirt•scratch detection binarizing circuit 504 of the dirt•scratch detecting circuit 509. After then, the dirt•scratch detection binarizing circuit 504 compares the shading-corrected image signal with a predetermined dirt•scratch detection threshold to execute the binarizing process of the image signal.

The adding circuit 505 adds the output from the dirt•scratch detection binarizing circuit 504 and the output from the line memory 506, and the line memory 506 stores the data concerning the cumulatively added value of each pixel. Moreover, the dirt•scratch discrimination binarizing circuit 507 compares the cumulatively added value of each pixel with a predetermined dirt•scratch discrimination threshold, and thus discriminates that dirt is present on the running reading glass plate 122 or there is abnormality such as scratch or the like in the running reading glass plate 122 in regard to the pixel which exceeds the predetermined dirt•scratch discrimination threshold.

The dirt•scratch counting circuit 508 detects the number of abnormality such as dirt, scratch or the like and the width of the abnormality such as the dirt, the scratch or the like on the current reading line, on the basis of the output from the dirt•scratch discrimination binarizing circuit 507. Here, the width of the abnormality such as the dirt, the scratch or the like implies how many the pixels discriminated to include the dirt or the scratch continue in the main scan direction. Moreover, in counting the number of the dirt or the scratch, the dirt or the scratch having the width equal to the two pixels or more is counted as one dirt or scratch, and then the information representing that the number of the dirt or the scratch having the width of M pixels is N (M and N are natural numbers) is output.

The dirt•scratch correction circuit 510 corrects the pixel which has been discriminated by the dirt•scratch discrimination binarizing circuit 507 to include the dirt or the scratch. More specifically, the dirt•scratch correction circuit 510 executes linear interpolation of the pixel data discriminated to include the dirt or the scratch, by referring to the value of the normal pixel being each of the right-adjacent and left-adjacent pixels of the pixel discriminated to include the dirt or the scratch. In this case, because there is a fear that image quality somewhat deteriorates as a result of the above correction, the CPU 406 sets the optimum reading position from the output of the dirt•scratch counting circuit 508 in consideration of the number of the dirt or the scratch and the width of the dirt or the scratch. Incidentally, how to calculate the optimum reading position will be described later.

Figure 6:
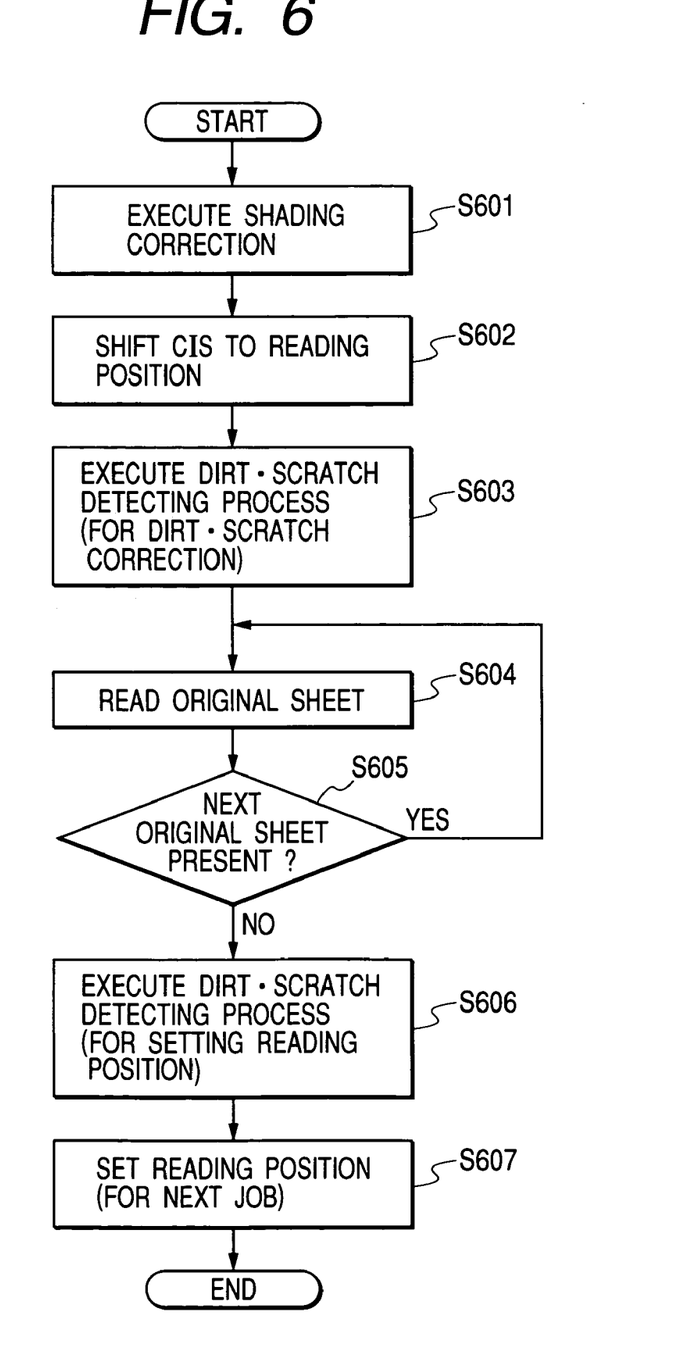
FIG. 6 is a flow chart showing a sequence of running reading by the image reading apparatus according to the embodiments of the present invention.

FIG. 6 is a flow chart showing an operation sequence of the image reading apparatus according to the present embodiment.

When a start button is depressed in a running reading mode (or flow scanning mode), the known shading correction is executed in a step S601, and then the CIS 110 is shifted to the running reading position set in a previous job in a step S602. Subsequently, in a step S603, before the original sheet is transported, the running reading glass plate 122 and the platen roller 201 are read in the state that the platen roller 201 is rotated, and a dirt•scratch correction dirt•scratch detecting process is executed to the running reading glass plate 122. Then, the original sheet is read in a step S604. When it is discriminated in a step S605 that a next original sheet is present, the flow returns to the step S604. When there is no next original sheet, a reading position setting dirt•scratch detecting process is executed in a step S606. Then, in a step S607, an optimum reading position for a next job is set in response to the result of the step S606.

Subsequently, the dirt•scratch correction dirt•scratch detecting process in the step S603 will be explained with reference to FIG. 5.

The signal output from the linear image sensor 113 by reading the running reading glass plate 122 and the platen roller 201 in the state that the platen roller 201 is rotated at the current running reading position, is converted into the digital signal by the A/D converting circuit 401. Then, the shading correction is executed to the obtained digital signal by the shading correction circuit 503, and the shading-corrected image signal is output. Next, in the dirt•scratch detecting circuit 509, the shading-corrected image signal is first binarized by comparing it with a dirt•scratch detection threshold by the dirt•scratch detection binarizing circuit 504. Here, it is assumed that a binarized value "1" is given when the image signal is smaller than the dirt•scratch detection threshold, and a binarized value "0" is given when the image signal is larger than the dirt•scratch detection threshold. After then, the binarized values are cumulatively added for each pixel by the adding circuit 505 and the line memory 506. The above cumulative adding is executed by a predetermined number of lines, and a case where the target lines for the cumulative adding are continuous lines and a case where the target lines are intermittent lines of X-line intervals are thought.

Thus, by cumulatively adding together the binarized image data for each pixel, the cumulatively added value in regard to the corresponding pixel has a large value when it is discriminated that the dirt or the scratch is present. Next, in the dirt•scratch discrimination binarizing circuit 507, the cumulatively added value of each pixel is compared with the predetermined dirt•scratch discrimination threshold, and the pixel exceeding the predetermined dirt•scratch discrimination threshold is discriminated to include the dirt or the scratch. Then, in response to the signal discriminated by the dirt•scratch discrimination binarizing circuit 507 to include the dirt or the scratch, the dirt•scratch correction circuit 510 executes the correction process to the data of the pixel discriminated to include the dirt or the scratch at the time of the original sheet reading. On the contrary, when it is not discriminated by the dirt•scratch discrimination binarizing circuit 507 to include the dirt or the scratch, the dirt•scratch correction process is not executed.

Figure 7:
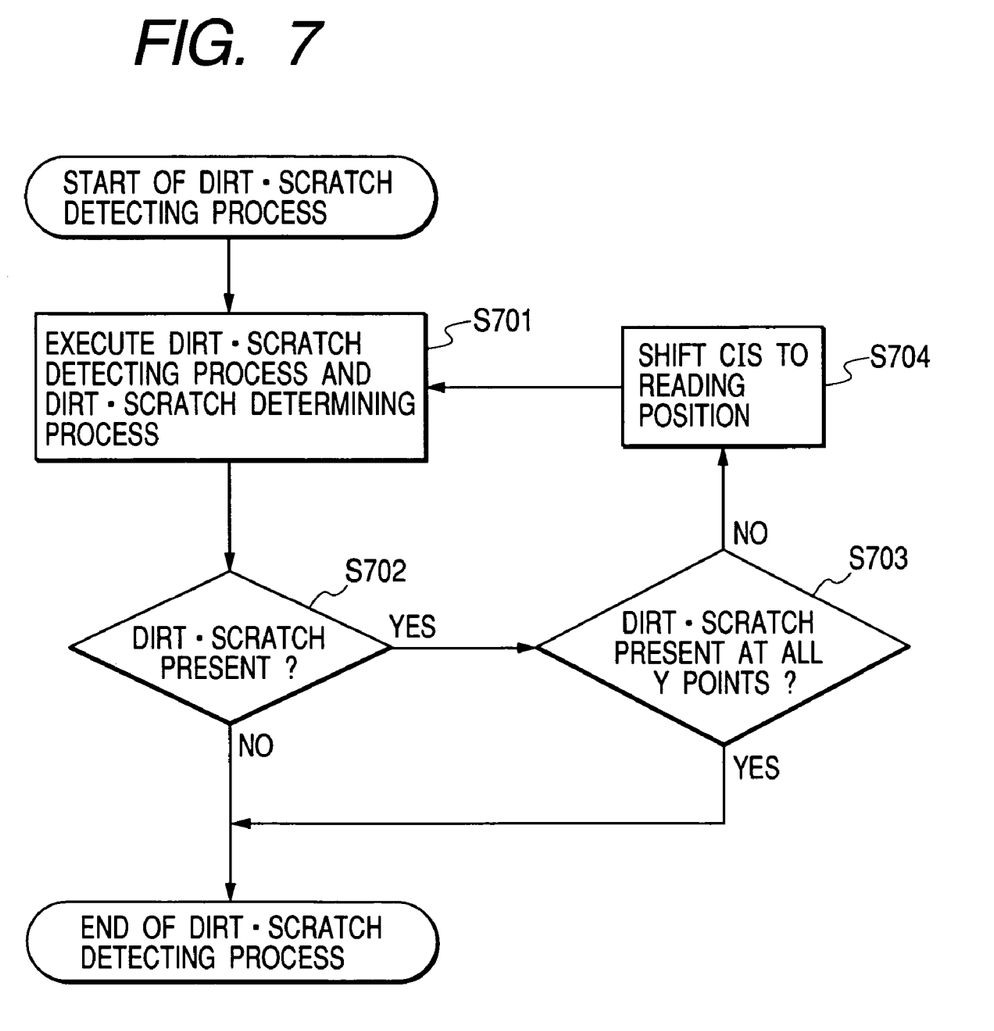
FIG. 7 is a flow chart showing a sequence of a dirt•scratch detecting process for reading position setting by the image reading apparatus according to the embodiments of the present invention.

Next, the running reading position setting dirt•scratch detecting process in the step S606 will be explained with reference to FIGS. 5 and 7.

In a step S701, the dirt•scratch detecting process is executed in the state that the platen roller 201 is rotated at the current running reading position after the original sheet reading ended. Then, the running reading glass plate 122 and the platen roller 201 are read, and the image signal output from the image sensor 113 is converted into the digital signal by the A/D converting circuit 401. Subsequently, the shading correction is executed to the obtained digital image signal by the shading correction circuit 503, and the shading-corrected image signal is output. Next, in the dirt•scratch detecting circuit 509, the shading-corrected image signal is first binarized by comparing it with the dirt•scratch detection threshold by the dirt•scratch detection binarizing circuit 504. Here, it is assumed that a binarized value "1" is given when the image signal is smaller than the dirt•scratch detection threshold, and a binarized value "0" is given when the image signal is larger than the dirt•scratch detection threshold. After then, the binarized values are cumulatively added for each pixel by the adding circuit 505 and the line memory 506. The above cumulative adding is executed by a predetermined number of lines, and a case where the target lines for the cumulative adding are continuous lines and a case where the target lines are intermittent lines of X-line intervals are thought.

Thus, by cumulatively adding together the binarized image data for each pixel, the cumulatively added value in regard to the corresponding pixel has a large value when it is discriminated that the dirt or the scratch is present. Next, in the dirt•scratch discrimination binarizing circuit 507, the cumulatively added value of each pixel is compared with the dirt•scratch discrimination threshold, and the pixel exceeding the dirt•scratch discrimination threshold is discriminated to include the dirt or the scratch. Here, it is assumed that a binarized value "1" is given when the image signal is smaller than the dirt•scratch detection threshold, and a binarized value "0" is given when the image signal is larger than the dirt•scratch detection threshold.

Next, the dirt•scratch counting circuit 508 detects the number of the dirt or the scratch and the width of the dirt or the scratch on the basis of the output from the dirt•scratch discrimination binarizing circuit 507, and outputs the information representing that the number of the dirt or the scratch having the width of M pixels is N (M and N are natural numbers). For example, the information representing that the dirt or the scratch having the width of "1" pixel is present in "4", the information representing that the dirt or the scratch having the width of "2" pixels is present in "3", the information representing that the dirt or the scratch having the width of "3" pixels is present in "0", . . . can be obtained.

Next, when it is not discriminated in a step S702 based on the output of the dirt•scratch counting circuit 508 that the dirt or the scratch is present, the dirt•scratch detecting process ends as it is, and the original sheet is thus read in the next job at the same running reading position as that in the current job. On the contrary, when it is discriminated in the step S702 that the dirt or the scratch is present, it is further discriminated in a step S703 whether or not the dirt or the scratch is present at all the reading positions among the set reading positions of Y points. When there is the position where the dirt•scratch detecting process is not executed, in a step S704 the CIS 110 is shifted to the position where the dirt•scratch detecting process is not executed, and the dirt•scratch detecting process is executed to this position in the step S701. On the contrary, when the dirt•scratch detecting process has been executed at all of the Y points, the dirt•scratch detecting process ends. Incidentally, it is assumed that Y is "3" and the distance between the adjacent reading positions is 0.5 mm.

Subsequently, the reading position setting in the step S607 will be explained.

In the step S607, the reading position on the line where the maximum width (the maximum pixel number where abnormal pixel data continue) of the dirt or the scratch detected on one line is the smallest is set as the reading position of the next job, on the basis of the output in the dirt•scratch detecting process of the step S606. In this case, the number of the dirt or the scratch of which the width is less than the N pixel width (N is natural number of "2" or more) and by which image quality deterioration is thus low when the dirt•scratch correction process is executed, is not counted, but only the number of the dirt or the scratch of which the width is equal to or wider than N pixel width is counted.

Incidentally, in addition to the above process, the reading position on the line where the number of the dirt or the scratch having the width equal to or wider than N pixel width is the least may be set as the reading position in the next job.

Moreover, on the basis of the output in the dirt•scratch detecting process of the step S606, the reading position on the line where the total number of pixels making the pixel data discriminated to include the dirt or the scratch on one line is the least, instead of the maximum width of the dirt or the scratch detected on one line, may be set as the reading position in the next job.

As explained above, when the running reading for reading the original sheet as shifting this sheet is executed, the position on which the influence of the abnormality such as a foreign matter (e.g., dirt) or the scratch is low is set as the image reading position even if the reading line on which there is no dirt or scratch cannot be detected. Therefore, it is possible to minimize the influence of the black stripe or the white stripe occurred due to the abnormality such as the foreign matter or the scratch on the running reading glass plate, or minimize the deterioration of the image quality even in case of correcting the black stripe or the white stripe.

Second Embodiment

Next, an image reading process according to the second embodiment of the present invention will be explained. In the above-described first embodiment, it is explained that the dirt•scratch detecting process is executed and the original sheet running reading position in the next job is set, after the original sheet reading in the current job ended. On one hand, in the present embodiment, the dirt•scratch detecting process is executed and the original sheet running reading position is set, after the current job stared. Here, it should be noted that the structural block diagram showing an image data flow, including a dirt•scratch detecting circuit of an image reading apparatus, in the present embodiment is the same as that in the first embodiment, whereby the explanation thereof will be omitted.

Figure 8:
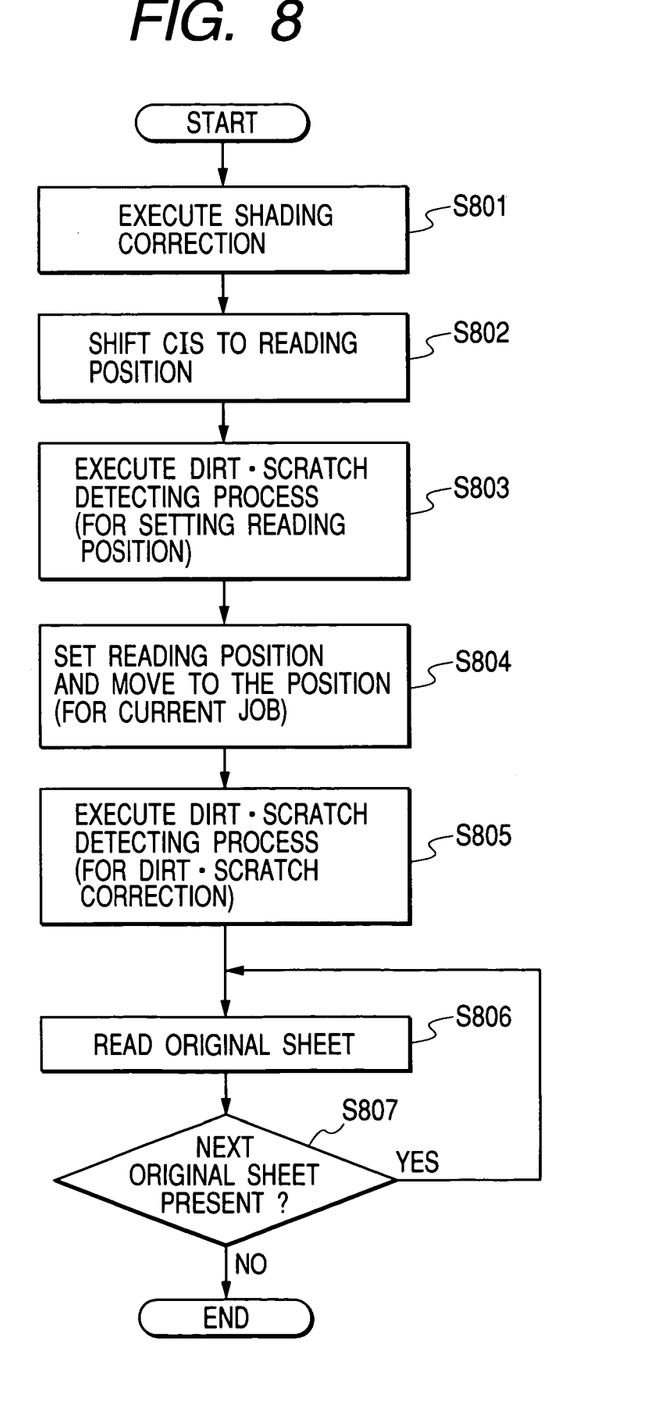
FIG. 8 is a flow chart showing a sequence of the running reading by the image reading apparatus according to the embodiments of the present invention.

FIG. 8 is a flow chart showing an operation sequence by the image reading apparatus according to the second embodiment of the present invention.

When a start button is depressed by a user in a running reading mode, the known shading correction is executed in a step S801, and then in a step S802 the CIS 110 is shifted to a running reading position set in a previous job. Subsequently, in a reading position setting dirt•scratch detecting process of a step S803, before an original sheet is transported, the running reading glass plate 122 and the platen roller 201 are read in the state that the platen roller 201 is rotated, and the dirt•scratch detecting process is executed to the running reading glass plate 122. Then, in a step S804, an optimum reading position is set in response to the output of the process in the step S803, and the CIS 110 is shifted to the set reading position. Next, the dirt•scratch correction dirt•scratch detecting process is executed in a step S805, and the original sheet is read in a step S806. When it is discriminated in a step S807 that a next original sheet is present, the flow returns to the step S806. On the contrary, when there is no next original sheet, the process ends.

Here, the reading position setting in the step S804 will be explained.

In the step S804, the reading position on the line where the maximum width (the maximum pixel number where abnormal pixel data continue) of dirt or scratch detected on one line is the smallest is set as the reading position of a next job, on the basis of the output in the dirt•scratch detecting process of the step S803. In this case, the number of the dirt or the scratch of which the width is less than N pixel width (N is natural number of "2" or more) and by which image quality deterioration is thus low when the dirt•scratch correction process is executed, is not counted, but only the number of the dirt or the scratch of which the width is equal to or wider than N pixel width is counted.

Incidentally, in addition to the above process, the reading position on the line where the number of the dirt or the scratch having the width equal to or wider than N pixel width is the least may be set as the reading position in the next job.

Moreover, on the basis of the output in the dirt•scratch detecting process of the step S803, the reading position on the line where the total number of pixels making the pixel data discriminated to include the dirt or the scratch on one line is the least, instead of the maximum width of the dirt or the scratch detected on one line, may be set as the reading position in the next job.

As explained above, in the reading position setting of the step S804, it is possible to set the optimum reading position even if the reading line on which there is no dirt or scratch cannot be detected.

Third Embodiment

Next, an image reading process according to the third embodiment of the present invention will be explained. In the above-described second embodiment, it is explained that the dirt•scratch detecting process is executed and the original sheet running reading position is set after the current job stared. In the second embodiment, even when the plural original sheets are read in the same job, all the original sheets are read at the same running reading position after the running reading position was set. On the contrary, in the present embodiment, when plural original sheets are read in the same job, a dirt•scratch detecting process and running reading position setting are executed about each original sheet. Here, it should be noted that the structural block diagram showing an image data flow, including a dirt•scratch detecting circuit, in the present embodiment is the same as that in the first embodiment, whereby the explanation thereof will be omitted.

Figure 9:
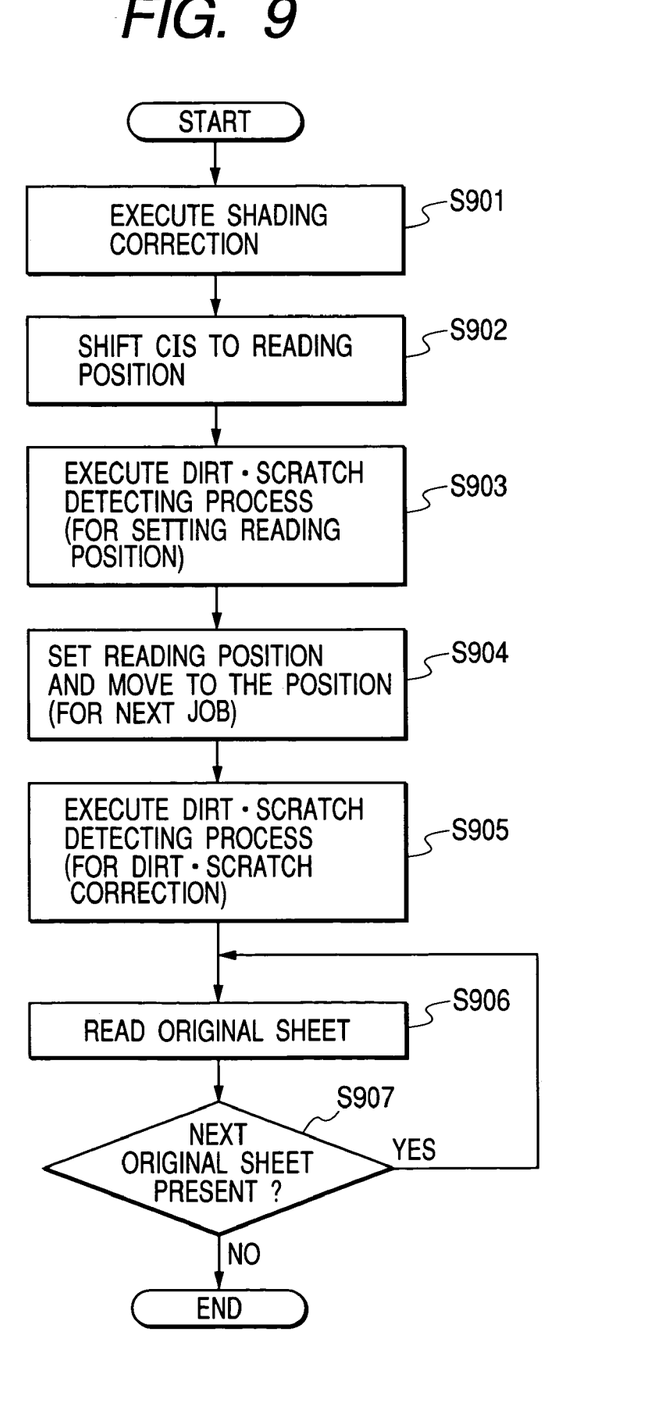
FIG. 9 is a flow chart showing a sequence of the running reading by the image reading apparatus according to the embodiments of the present invention.

FIG. 9 is a flow chart showing an operation sequence by an image reading apparatus according to the third embodiment of the present invention.

When a start button is depressed by a user in a running reading mode, the known shading correction is executed in a step S901, and then in a step S902 the CIS 110 is shifted to a running reading position set in a previous job. Subsequently, in a reading position setting dirt•scratch detecting process of a step S903, before an original sheet is transported, the running reading glass plate 122 and the platen roller 201 are read in the state that the platen roller 201 is rotated, and the dirt•scratch detecting process is executed to the running reading glass plate 122. Then, in a step S904, an optimum reading position is set in response to the output in the process of the step S903, and the CIS 110 is shifted to the set reading position. Next, a dirt•scratch correction dirt•scratch detecting process is executed in a step S905, and the original sheet is read in a step S906. When it is discriminated in a step S907 that a next original sheet is present, the flow returns to the step S903. On the contrary, when there is no next original sheet, the process ends.

Here, the reading position setting in the step S904 will be explained.

In the step S904, the reading position on the line where the maximum width (the maximum pixel number where abnormal pixel data continue) of dirt or scratch detected on one line is the smallest is set as the reading position of a next job, on the basis of the output in the dirt•scratch detecting process of the step S903. In this case, the number of the dirt or the scratch of which the width is less than N pixel width (N is natural number of "2" or more) and by which image quality deterioration is thus low when the dirt•scratch correction process is executed, is not counted, but only the number of the dirt or the scratch of which the width is equal to or wider than N pixel width is counted.

In addition to the above process, the reading position on the line where the number of the dirt or the scratch having the width equal to or wider than N pixel width is the least may be set as the reading position in the next job.

Moreover, on the basis of the output in the dirt•scratch detecting process of the step S903, the reading position on the line where the total number of pixels making the pixel data discriminated to include the dirt or the scratch on one line is the least, instead of the maximum width of the dirt or the scratch detected on one line, may be set as the reading position in the next job.

As explained above, in the reading position setting of the step S904, it is possible to set the optimum reading position even if the reading line on which there is no dirt or scratch cannot be detected.

Fourth Embodiment

The present invention may also be achieved by supplying a storage medium storing a program code of software for achieving the functions of the above first to third embodiments to a system or an apparatus and causing a computer (or CPU, MPU, etc.) of the system or the apparatus to read and execute the program code stored in the storage medium.

In that case, the program code itself which is read from the storage medium achieves the new functions of the present invention, and thus the storage medium which stores the program code and the program itself constitute the present invention.

The storage medium for supplying the program code may be, for example, a flexible disk, a hard disk, an optical disk, a magnetooptical disk, a CD-ROM, a CD-R, a CD-RW, a DVD-ROM, a DVD-RAM, a DVD-RW, a DVD+RW disk, a magnetic tape, a nonvolatile memory card, a ROM, or the like.

Moreover, the functions of the above embodiments may be achieved not only by causing the computer to read and execute the program code but also by causing an operating system (OS) or the like running on the computer to execute a part or all of the process on the basis of instructions of the program code.

Furthermore, the functions of the above embodiments may also be achieved by writing the program code read from the storage medium to a memory of a function extension board inserted in the computer or to a memory of a function extension unit connected to the computer and causing a CPU of the function extension board or the function extension unit to execute a part or all of the process on the basis of instructions of the program code.

What is claimed is:

1. An image reading apparatus comprising:

a linear image sensor to photoelectrically convert an optical image obtained by optically scanning an original sheet and read it in units of line;

an original sheet feeding unit to feed the original sheet onto an original sheet glass plate;

a discrimination unit that operates, in a case where abnormal pixel data of two or more pixels are continuously obtained on a reading line of said linear image sensor by reading said original sheet glass plate through said linear image sensor, to discriminate that dirt is present on said original sheet glass plate or that there is an abnormality in said original sheet glass plate; and a setting unit to set, as a reading line, a line on which the maximum pixel number that the abnormal pixel data can continue being read is the least.

2. An image reading apparatus according to claim 1, further comprising a counting unit to count the number of pixels affected by said dirt and said abnormality on the one line discriminated by said discrimination unit, wherein said setting unit sets, as a reading line, the line on which the maximum pixel number that the abnormal pixel data can continue being read is the least and or which the number of pixels affected by said dirt and said abnormality is the least.

3. An image reading apparatus comprising:

a linear image sensor to photoelectrically convert an optical image obtained by optically scanning an original sheet and read it in units of line;

an original sheet feeding unit to feed the original sheet onto an original sheet glass plate;

a discrimination unit that operates, in a case where abnormal pixel data of two or more pixels are continuously obtained on a reading line of said linear image sensor by reading said original sheet glass plate through said linear image sensor, to discriminate that dirt is present on said original sheet glass plate or that there is an abnormality in said original sheet glass plate;

a counting unit to count the number of pixels affected by said dirt and said abnormality on the one line discriminated by said discrimination unit; and a setting unit to set, as a reading line, a line on which the number of pixels affected by said dirt and said abnormality counted by said counting unit is the least.

4. An image reading apparatus comprising:

a linear image sensor to photoelectrically convert an optical image obtained by optically scanning an original sheet and read it in units of line;

an original sheet feeding unit to feed the original sheet onto an original sheet glass plate;

a discrimination unit that operates, in a case where abnormal pixel data of two or more pixels are continuously obtained on a reading line of said linear image sensor by reading said original sheet glass plate through said linear image sensor, to discriminate that dirt is present on said original sheet glass plate or that there is an abnormality in said original sheet glass plate;

a counting unit to count a total number of pixels of abnormal pixel data caused by said dirt and said abnormality on the one line discriminated by said discrimination unit; and a setting unit adapted to set, as a reading line, a line on which said total number of pixels counted by said counting unit is the least.

* * * * *

UNITED STATES PATENT AND TRADEMARK OFFICE
CERTIFICATE OF CORRECTION

| | |
|---|---|
| PATENT NO. | : 7,352,495 B2 |
| APPLICATION NO. | : 10/712993 |
| DATED | : April 1, 2008 |
| INVENTOR(S) | : Mitsuhiro Sugeta |

Page 1 of 1

It is certified that error appears in the above-identified patent and that said Letters Patent is hereby corrected as shown below:

COLUMN 1:

Line 22, "an" should read --a--.

COLUMN 3:

Line 20, "embodiment" should read --embodiments--.

COLUMN 8:

Line 40, "stared" should read --started--.

COLUMN 9:

Line 39, "stared" should read --started--.

Signed and Sealed this

Ninth Day of September, 2008

JON W. DUDAS
*Director of the United States Patent and Trademark Office*